(12) United States Patent
Yio et al.

(10) Patent No.: US 10,298,059 B2
(45) Date of Patent: May 21, 2019

(54) COVER AND ELECTRONIC DEVICE INCLUDING THE SAME

(71) Applicant: SAMSUNG ELECTRO-MECHANICS CO., LTD., Suwon-si (KR)

(72) Inventors: Soon Joung Yio, Suwon-si (KR); Hee Seung Kim, Suwon-si (KR); Jae Sun Won, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 268 days.

(21) Appl. No.: 15/226,325

(22) Filed: Aug. 2, 2016

(65) Prior Publication Data

US 2017/0098958 A1    Apr. 6, 2017

(30) Foreign Application Priority Data

Oct. 2, 2015   (KR) .................... 10-2015-0139386
Dec. 1, 2015   (KR) .................... 10-2015-0170137
Mar. 25, 2016  (KR) .................... 10-2016-0035782

(51) Int. Cl.

| H02J 50/10 | (2016.01) |
| H01F 27/28 | (2006.01) |
| H02J 7/02 | (2016.01) |
| H01F 38/14 | (2006.01) |
| H04M 1/18 | (2006.01) |
| H02J 50/70 | (2016.01) |

(52) U.S. Cl.
CPC .......... *H02J 50/10* (2016.02); *H01F 27/2804* (2013.01); *H01F 27/2885* (2013.01); *H01F 38/14* (2013.01); *H02J 7/025* (2013.01); *H02J 50/70* (2016.02); *H04M 1/185* (2013.01)

(58) Field of Classification Search
CPC ..... H02J 50/10; H05K 9/0007; H05K 5/0247; H05K 9/00; H05K 9/0026; H05K 9/0086
See application file for complete search history.

(56) References Cited

U.S. PATENT DOCUMENTS 8,462,490 B2    6/2013  Shin et al.
9,812,774 B2 *  11/2017 Jang ................. H01Q 1/526
(Continued)

FOREIGN PATENT DOCUMENTS

CN    102316687 A    1/2012
CN    104040835 A    9/2014
(Continued)

OTHER PUBLICATIONS

Chinese Office Action dated Feb. 2, 2019 in corresponding Chinese Patent Application No. 201610791986.8 (13 pages in English and 9 pages in Chinese).
(Continued)

*Primary Examiner* — Timothy J Thompson
*Assistant Examiner* — Amol H Patel
(74) *Attorney, Agent, or Firm* — NSIP Law (57) ABSTRACT

A cover of a portable terminal, the cover includes a conductive layer having conductive tiles formed in a region corresponding to a coil, and a protective layer disposed on a surface of the conductive layer.

20 Claims, 8 Drawing Sheets

(56) References Cited

U.S. PATENT DOCUMENTS

| | | |
|---|---|---|
| 2007/0184229 A1 | 8/2007 | Jeong |
| 2011/0317343 A1 | 12/2011 | Shin et al. |
| 2013/0202848 A1* | 8/2013 | Kim ................... H01B 7/421 |
| | | 428/141 |
| 2014/0176380 A1* | 6/2014 | Choi ................... H01Q 1/38 |
| | | 343/787 |
| 2014/0182911 A1* | 7/2014 | Lee ................... H05K 1/185 |
| | | 174/260 |
| 2015/0027232 A1 | 1/2015 | Matsumoto |
| 2015/0054455 A1 | 2/2015 | Kim et al. |
| 2015/0102892 A1* | 4/2015 | Yeo ................... H01F 1/14716 |
| | | 336/200 |
| 2015/0123604 A1* | 5/2015 | Lee ................... H01F 38/14 |
| | | 320/108 |
| 2015/0257251 A1 | 9/2015 | Kagawa |
| 2015/0342099 A1* | 11/2015 | Jang ................... H01F 1/16 |
| | | 174/350 |
| 2016/0043461 A1* | 2/2016 | Murayama ............ H01Q 7/06 |
| | | 343/702 |
| 2016/0064814 A1* | 3/2016 | Jang ................... H01Q 1/526 |
| | | 343/842 |
| 2016/0106012 A1* | 4/2016 | Jang ................... H05K 9/0086 |
| | | 361/679.26 |
| 2018/0198310 A1* | 7/2018 | Hwang ................ H02J 7/02 |

FOREIGN PATENT DOCUMENTS

| | | |
|---|---|---|
| CN | 104346021 A | 2/2015 |
| CN | 104364968 A | 2/2015 |
| KR | 10-2007-0080755 A | 8/2007 |
| KR | 10-2012-0001458 A | 1/2012 |
| KR | 10-2014-0124134 A | 10/2014 |
| KR | 10-2015-0043087 A | 4/2015 |
| KR | 10-2015-0090391 A1 | 8/2015 |
| KR | 10-2015-0104510 A | 9/2015 |
| WO | WO 2013/180399 A1 | 12/2013 |
| WO | WO 2013/180399 A1 | 9/2014 |

OTHER PUBLICATIONS

Korean Office Action dated Jan. 11, 2019 in corresponding Korean Patent Application No. 10-2016-0035782 (5 pages in English and 5 pages in Korean).

* cited by examiner

COVER AND ELECTRONIC DEVICE INCLUDING THE SAME

CROSS-REFERENCE TO RELATED APPLICATION(S)

This application claims the benefit under 35 USC 119(a) of Korean Patent Application Nos. 10-2015-0139386 filed on Oct. 2, 2015, 10-2015-0170137 filed on Dec. 1, 2015, and 10-2016-0035782 filed on Mar. 25, 2016 in the Korean Intellectual Property Office, the entire disclosures of which are incorporated herein by reference for all purposes.

BACKGROUND

1. Field

The following description relates to a cover and a portable terminal including the same.

2. Description of Related Art

Wireless transfer technology has been widely applied to a variety of electronic devices including various communications/portable terminals as well as smartphones and wearable devices. Metal cases have been adopted as the covers of many electronic devices due to design considerations. However, in a case in which the cover of the electronic device is formed of a metal material, an eddy current caused by wirelessly transferred electromagnetic waves may occur, and current loss may occur due to the eddy current.

Depending on the current loss, a coupling factor determining efficiency of a wireless power transfer system may be degraded, it may be difficult to wirelessly charge the electronic device, or charging efficiency of the electronic device may be significantly degraded.

The current loss due to the eddy current may significantly degrade the efficiency of a wireless transfer or cause a hot spot, which may cause a problem in which it may be difficult to radiate heat.

SUMMARY

This Summary is provided to introduce a selection of concepts in a simplified form that are further described below in the Detailed Description. This Summary is not intended to identify key features or essential features of the claimed subject matter, nor is it the Summary intended to be used as an aid in determining the scope of the claimed subject matter.

In one general aspect, a cover of a portable terminal, the cover includes a conductive layer having conductive tiles formed in a region corresponding to a coil, and a protective layer disposed on a surface of the conductive layer.

The protective layer may include an insulating layer formed by anodizing the surface of the conductive layer.

The conductive layer may include graphite.

The cover may further include an insulating member formed in a space between the conductive tiles. The protective layer may include an insulating member covering another surface of the conductive layer.

A shape of the conductive layer may correspond to a shape of the coil. A region of the conductive layer other than the region corresponding to the coil may have a substantially rectangular shape.

The cover may further include a cutout part formed in a region corresponding to a winding center of the coil.

In another general aspect, a portable terminal includes a device body, a coil wiring electrically connected to the device body, and a cover disposed over a surface of the coil wiring, wherein the cover includes a conductive layer having conductive tiles in a region corresponding to the coil wiring, and a protective layer formed on a surface of the conductive layer.

The protective layer comprises an insulating layer formed by anodizing another surface of the conductive layer.

The conductive layer may include graphite.

The cover may further include an insulating member formed in a space between the conductive tiles. The protective layer may include another insulating member covering the surface of the conductive layer.

The protective layer may include an insulating member disposed in a space between the conductive tiles and covers the surface of the conductive layer.

A shape of the conductive layer may correspond to a shape of the coil wiring. The tiles may have an arc shape and may be arranged concentrically around a central axis the coil wiring.

The cover may further include a cutout part formed in a region corresponding to a winding center of the coil wiring.

A region of the conductive layer other than the region corresponding to the coil wiring may have a substantially rectangular shape.

In another general aspect, a portable terminal includes a coil wiring, and a cover disposed over the coil wiring. The cover includes a conductive layer having an insulating layer disposed on a first surface of the conductive layer, protrusions extending from the insulating layer, and grooves disposed between the protrusions and extending from first surface of the conductive layer to a second surface of the conductive layer, opposite the first surface, and an insulating material is disposed in the grooves. The conductive layer is configured to prevent a current from flowing between the protrusions.

The protrusions may be arranged concentrically around a central axis the coil wiring.

Other features and aspects will be apparent from the following detailed description, the drawings, and the claims.

BRIEF DESCRIPTION OF DRAWINGS

FIGS. 5A through 6E are plan views illustrating examples of various shapes of a conductive plate;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

The terminology used herein is for describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Figure 1:
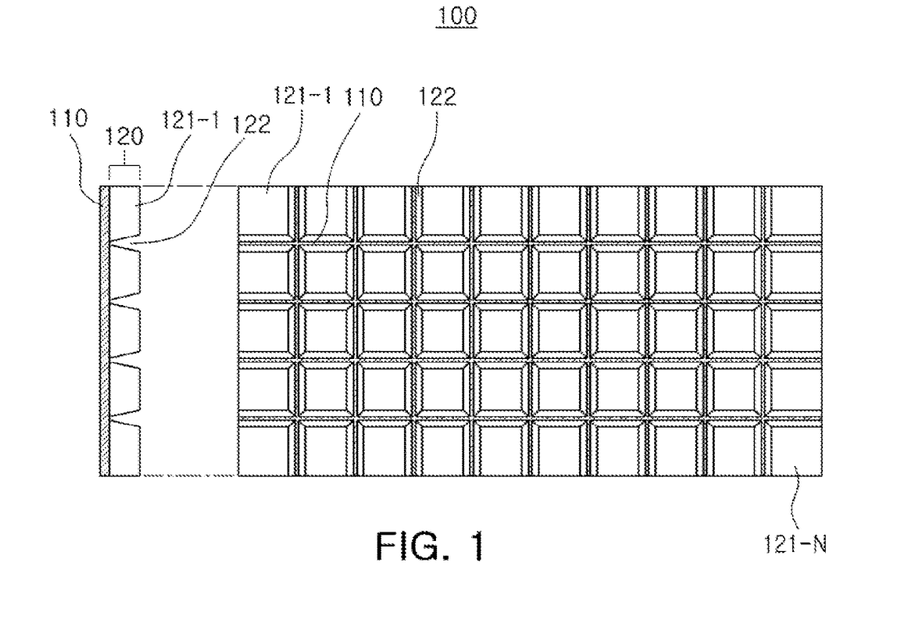
FIG. 1 is a side view and a plan view illustrating an example of a conductive plate.

FIG. 1 is a side view and a plan view illustrating a conductive plate according to one or more embodiments. Referring to FIG. 1, the conductive plate 100 according to the present embodiment includes an insulating layer 110 and a conductive layer 120. Further, the conductive plate 100 may further include an adhesive layer.

The insulating layer 110 is formed on at least one surface of the conductive layer 120 to serve as a protective layer protecting the conductive layer 120. The insulating layer 110 may be formed by anodizing one surface of the conductive layer 120. Alternatively, the insulating layer 110 may be formed of an insulating film such as polyethylene terephtalate (PET), polycarbonate (PC), polyethersulfone (PES), polyimide (PI), polymethlymethacrylate (PMMA), or cyclo-olefin polymers (COP). However, the material of the insulating layer 110 is not limited thereto.

The conductive layer 120 includes a plurality of conductive tiles, or protrusions, 121-1 to 121-N formed on the insulating layer 110. For example, the conductive layer 120 may be formed of the plurality of conductive tiles 121-1 to 121-N arranged on at least one surface of insulating layer 110. The plurality of conductive tiles 121-1 to 121-N serve as a heat radiating member, or heat dissipating member, that effectively radiates or dissipates heat.

In addition, the plurality of conductive tiles 121-1 to 121-N have a space formed between each tile. For example, the plurality of conductive tiles 121-1 to 121-N are spaced apart from each other while having a gap, or groove, 122. Accordingly, a formation of a closed loop of an eddy current generated when a wireless transfer electromagnetic wave passes through the plurality of conductive tiles may be prevented. As a result, current loss by the eddy current may be significantly reduced.

In addition, the plurality of conductive tiles 121-1 to 121-N may be formed of a metal material having excellent permeability of electromagnetic waves and excellent thermal diffusion characteristics. For example, the metal material may include aluminum or graphite. However, the metal material of the plurality of conductive tiles is not limited thereto. A size of each of the plurality of conductive tiles 121-1 to 121-N may be adjusted to reduce the eddy current and to improve heat radiation performance. In addition, a thickness of the anodized insulating layer 110 may be determined depending on a depth of the gap 122 between the plurality of conductive tiles 121-1 to 121-N.

The adhesive layer may be formed on a surface of the insulating layer 110 adjacent to the conductive layer 120 or a surface of the conductive layer 120 adjacent to the insulating layer 110. The adhesive layer may also be formed on another surface of the conductive layer 120 opposite the insulating layer 110 and on another surface of the insulating layer 110 opposite the conductive layer 120. For example, the adhesive layer may include one or more of an acrylic resin, an epoxy resin, an ethylene propylene diene monomer (EPDM) resin, a chlorinated polyethylene (CPE) resin, a silicon, a polyurethane, a urea resin, a melamine resin, a phenol resin, and an unsaturated ester resin, as a polymer resin.

The conductive plate may be attached to a wireless transfer coil or a cover of an electronic device by the adhesive layer, so as to be disposed on one surface of the wireless transfer coil.

Figure 2:
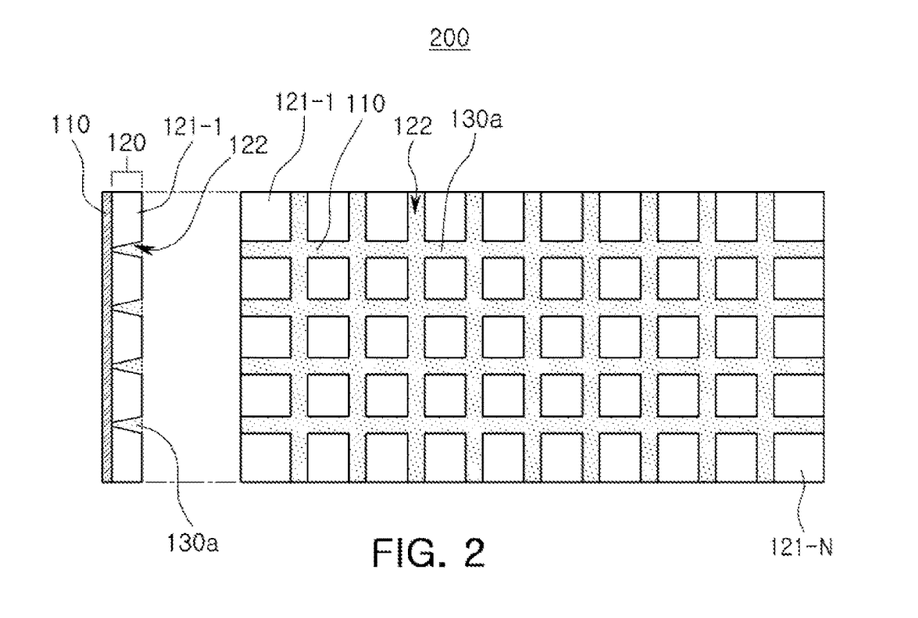
FIG. 2 is a side view and a plan view illustrating another example of a conductive plate.
Figure 3:
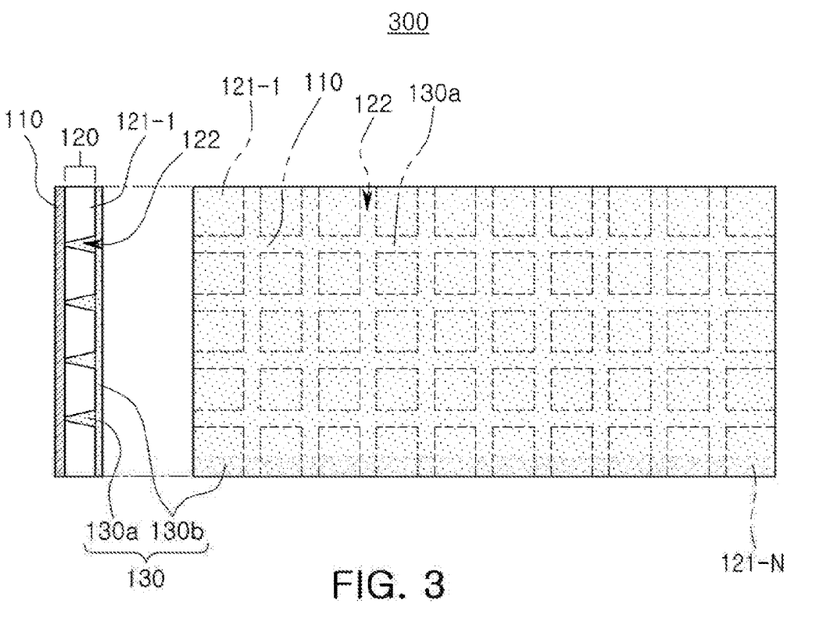
FIG. 3 is a side view and a plan view illustrating another example of a conductive plate.

FIG. 2 is a side view and a plan view illustrating a conductive plate according to one or more embodiments. FIG. 3 is a side view and a plan view illustrating a conductive plate according to one or more embodiments.

Referring to FIG. 2, the conductive plate 200 includes an insulating member 130a in addition to the configuration described in FIG. 1. The insulating member 130a is formed in the space between the plurality of conductive tiles 121-1 to 121-N of the conductive layer 120. That is, the insulating member 130a fills in the gap 122. The insulating member 130a may be an electrical insulating material such as a silicon, and may have adhesive properties. In addition, the insulating member 130a may have a material having higher thermal conductivity than air. Accordingly, the insulating member 130a may prevent infiltration of a foreign material into the gap 122 of the plurality of conductive tiles 121-1 to 121-N, thus preventing a short circuit, and heat radiation performance may also be improved.

Further, referring to FIG. 3, the insulating member 130 of the conductive plate 300 includes a first member 130a and a second member 130b. The first member 130a may be formed in the gap 122, the space between the plurality of conductive tiles 121-1 to 121-N forming the conductive layer 120, and the second member 130b may cover one surface of the conductive layer 120. For example, the second member 130b may be coated so that one surface thereof covers a surface of the conductive layer 120, to serve as a protective layer protecting the conductive layer 120. In addition, since the insulating member 130 may have adhesive properties, the insulating member 130 may replace the adhesive layer described in FIG. 1.

The conductive plate described above in FIGS. 1 through 3 may be disposed on at least one surface of a wireless power transmitting coil included in a charger that wirelessly transmits power. Further, the conductive plate may be disposed on at least one surface of a wireless power receiving coil included in an electronic device that wirelessly receives the power.

Meanwhile, the conductive plate may be disposed on a wireless communications coil for near field communication (NFC), or a magnetic secure transmission (MST) type using the wireless transfer of electromagnetic waves.

Figure 4:
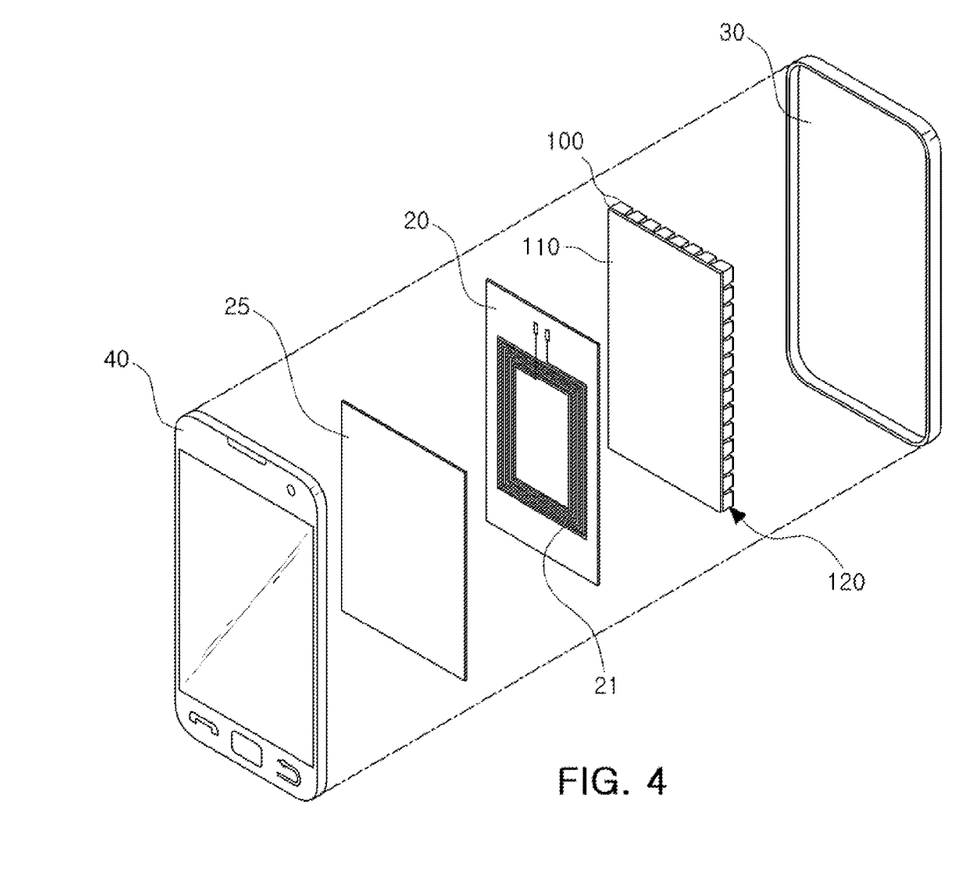
FIG. 4 is an exploded perspective view schematically illustrating an example of a portable terminal.

Hereinafter, an example of a portable terminal including the conductive plate will be described with reference to FIG. 4. FIG. 4 is an exploded perspective view schematically illustrating an electronic device according to one or more embodiments. Although the electronic device is illustrated as a portable terminal by way of example, the electronic device is not limited thereto.

Referring to FIG. 4, the electronic device includes a device body 40, a coil substrate 20, a cover 30, and a conductive plate 100 disposed between the coil substrate 20 and the cover 30. Further, the electronic device includes a shielding sheet 25.

The coil substrate 20 is disposed in the electronic device, and includes a coil wiring 21 formed on a substrate. The coil substrate 20, a thin film substrate, may be, for example, a flexible board such as a flexible printed circuit board (FPCB). However, the coil substrate 20 is not limited thereto.

The coil wiring 21, a transmitting or receiving coil for wireless transmissions, may be a circuit wiring on at least one surface of an insulating substrate 22. The coil wiring 21 may have a spiral shape, and may have contact pads formed at both ends thereof. The contact pads electrically connect the coil wiring 21 to the device body 40.

Although one or more embodiments describes a case in which the coil wiring 21 is generally formed in a quadrangular spiral shape by way of example, the shape of the coil wiring 21 is not limited thereto and may be varied. For example, the coil wiring 21 may be formed in a circular spiral shape, or a polygonal spiral shape.

An insulating protective layer for protecting the coil wiring 21 from the electrical shorts may be formed on one surface of the coil wiring 21.

The conductive plate 100 is disposed on one surface of the coil wiring 21, and includes an insulting layer 110 and a conductive layer 120.

Although FIG. 4 illustrates a case in which the insulating layer 110 of the conductive plate 100 is disposed adjacent to the coil wiring 21 and the conductive layer 120 thereof is disposed adjacent to the cover 30, the conductive plate 100 may be reversed such that the conductive layer 120 is disposed adjacent to the coil wiring 21. In some cases the conductive plate 100 may be attached to the cover 30 or the conductive plate 100 may replace the cover 30 . . . the like.

As described in FIGS. 1 through 3, the conductive layer 120 is formed of the plurality of conductive tiles arranged on one surface of the insulating layer 110. Further, the conductive plate 100 includes an insulating member formed in the space between the plurality of conductive tiles.

The shielding sheet 25 is disposed on one surface of the coil substrate 20. The shielding sheet 25 is provided to efficiently form a magnetic path for an electromagnetic field generated by wireless power electromagnetic waves transmitted by the charger. To this end, the shielding sheet 25 has a flat plate shape (or a sheet shape), and may be a magnetic sheet such as a ferrite sheet, or a metal sheet such as an aluminum sheet. However, a material of the shielding sheet 25 is not limited thereto.

The shielding sheet 25 is not limited to the above-mentioned configuration and may be variously applied. For example, the shielding sheet 25 may be formed by applying ferrite powder particles or conductive powder particles to one surface of the coil substrate 20.

The cover 30 may be coupled to the device body 40 to complete or enclose the electronic device, and may be a battery cover separated from the device body 40 to replace a battery.

The conductive plate 100 may be integrally formed with the cover 30, or the cover 30 may be omitted and the conductive plate 100 may function as the cover 30. For example, the conductive plate 100 may be configured to couple to the device body 40, and the insulating layer 110 may form an outer surface of the electronic device. Examples thereof will be described below with reference to FIGS. 7 and 8.

FIGS. 5A through 6E are plan views illustrating various shapes of a conductive plate according to one or more embodiments.

Figure 5A:
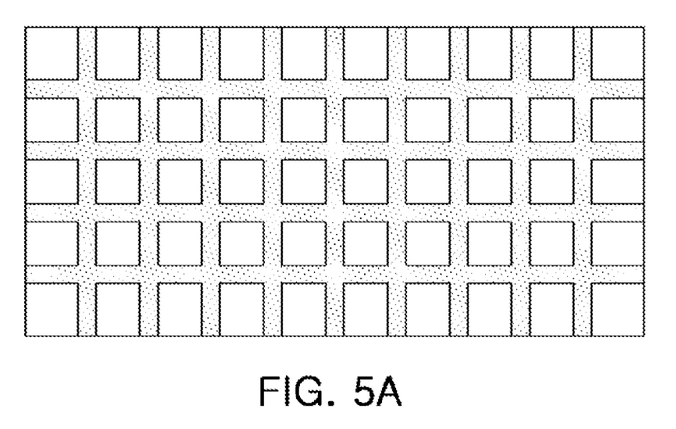
Figure 5B:
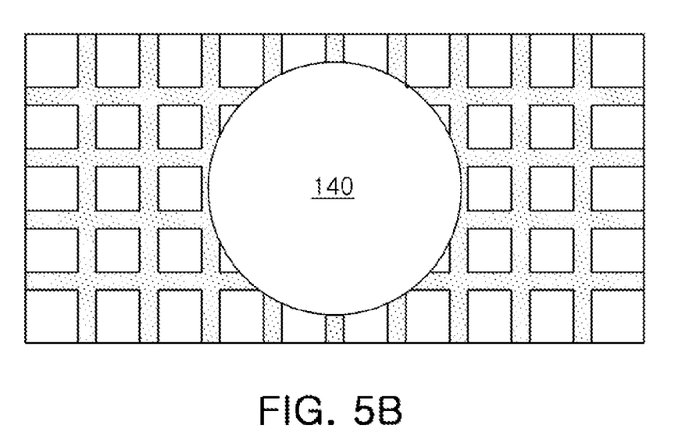

Referring to FIGS. 5A and 5B, the conductive plate has a cutout part 140. The cutout part 140 may be formed in a region corresponding to a winding center of the coil wiring 21 illustrated in FIG. 4. Accordingly, an electromagnetic field may be formed through a center region of the coil wiring and the cutout part 140, thereby improving efficiency of wireless transfer.

Figure 6A:
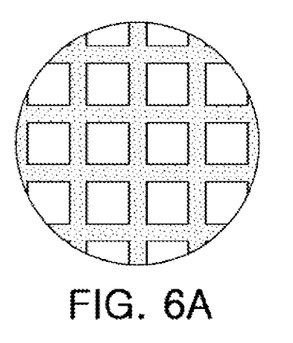
Figure 6B:
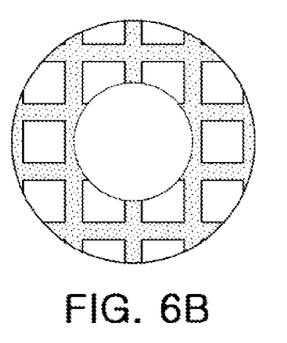

Referring to FIGS. 6A through 6E, the conductive plate 100 has various shapes depending on a size and a shape of the wireless transfer coil. The conductive plate may have a circular shape as illustrated in FIG. 6A, and the conductive plate may include a cutout part as illustrated in FIG. 6B.

Figure 6C:
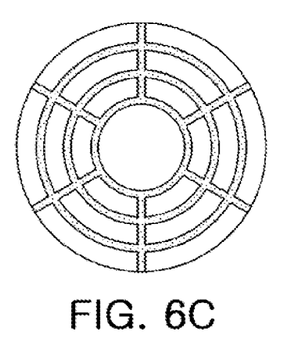
Figure 6D:
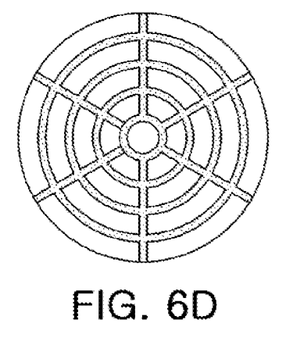

Further, as illustrated in FIGS. 6C and 6D, the plurality of conductive tiles included in the conductive layer of the conductive plate may be radially arranged.

Figure 6E:
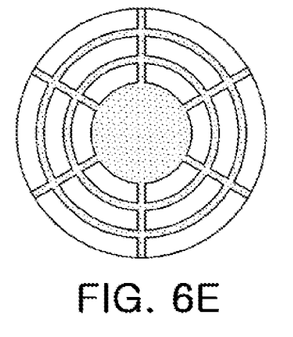

Further, as illustrated in FIG. 6E, the cutout part of the conductive plate is filled an insulating layer or an insulating member.

Figure 7:
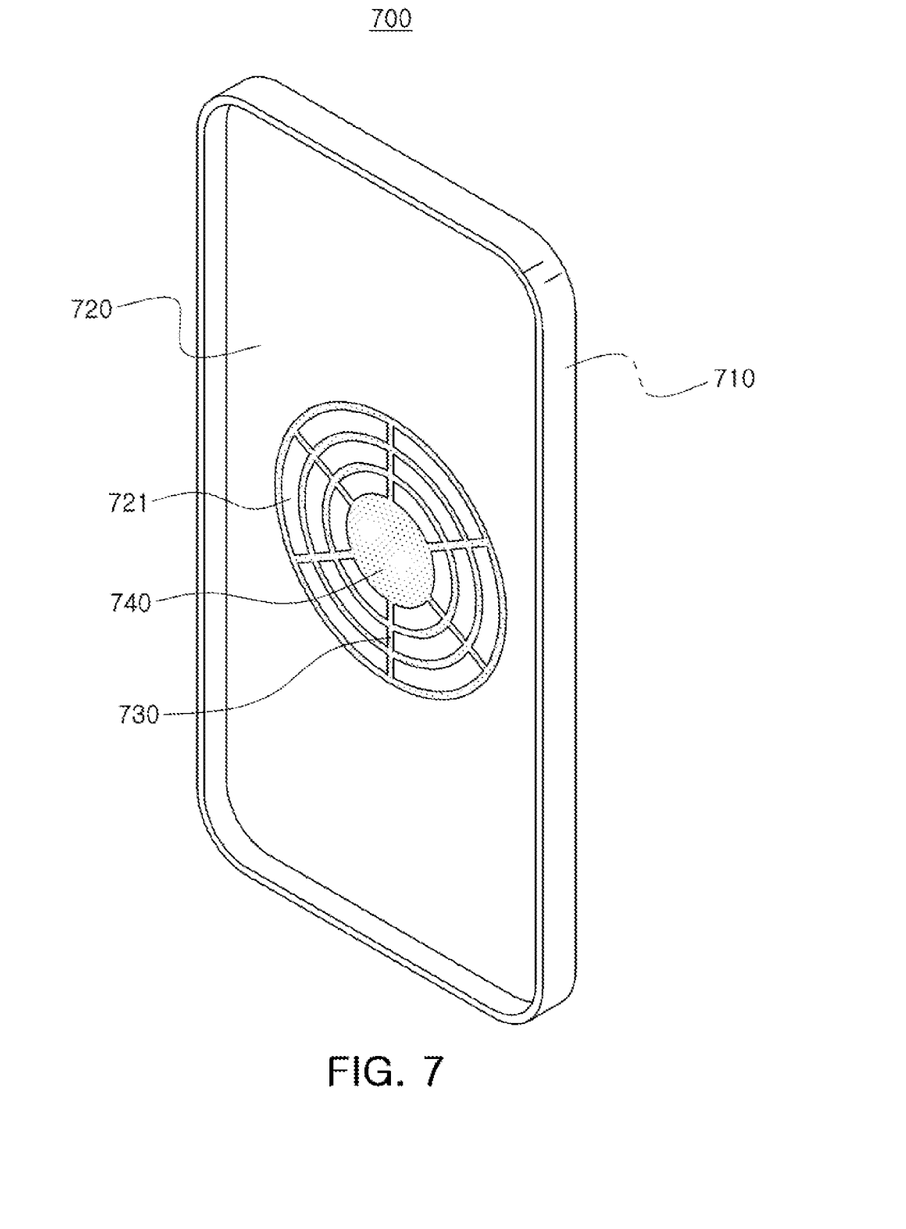
FIG. 7 is a perspective view illustrating an example of a cover.
Figure 8:
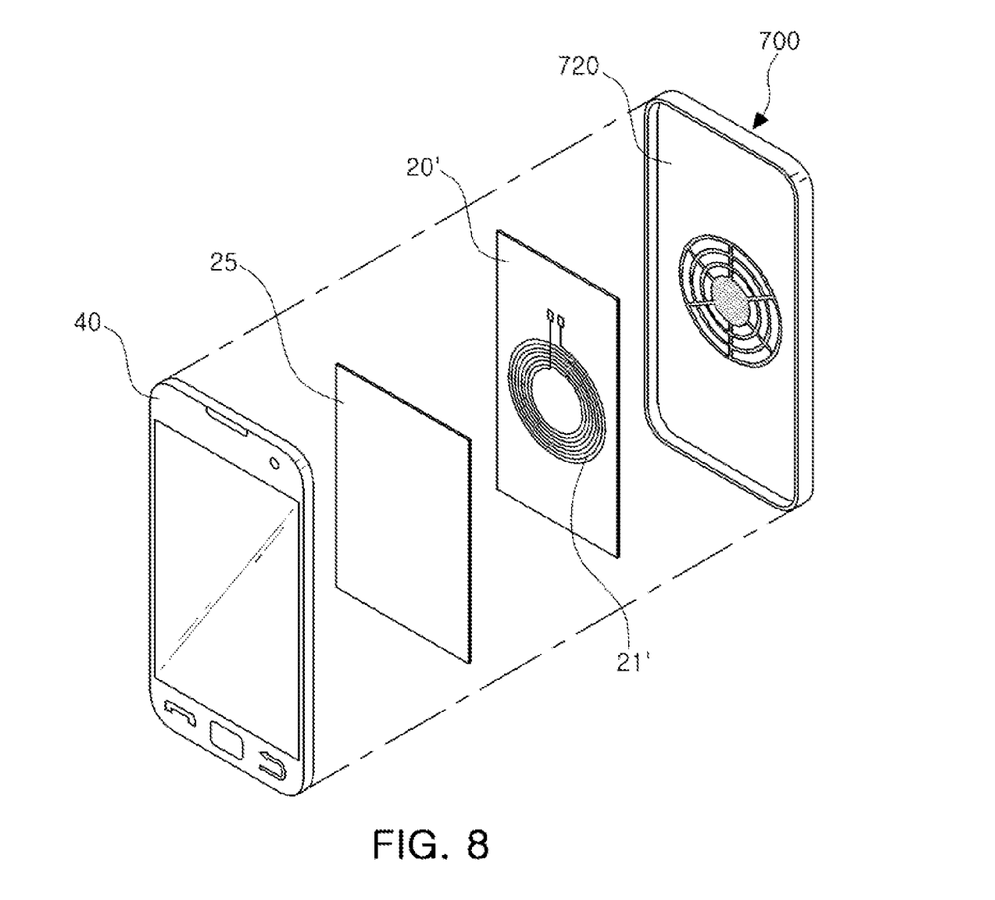
FIG. 8 is an exploded perspective view illustrating an example of a portable terminal including the cover of FIG. 7.

FIGS. 7 and 8 are perspective views illustrating an example of a conductive plate which is integral with the cover of a portable terminal, while having the conductive plate and the electronic device illustrated in FIGS. 1 through 6E as a basic configuration. Therefore, in order to avoid unnecessary overlaps in descriptions, a detailed description of the contents which are same as or similar to those described above will be omitted, and components which are same as or correspond to the component described above will be denoted by the same reference numerals.

Referring to FIG. 7, a cover 700 includes a protective layer 710 and a conductive layer 720. The protective layer 710 forms an outer surface of the electronic device. A method for forming the protective layer 710, a configuration of the protective layer 710, and a function of the protective layer 710 are the same as those described above with reference to FIGS. 1 through 6E.

The conductive layer 720 may be formed of a metal material having a plate shape. The conductive layer, which may be a metal case of the portable terminal, may be coupled to the device body. Further, the conductive layer 720 includes a plurality of conductive tiles 721 in some regions corresponding to the wireless transfer coil. Although FIG. 7 basically illustrates the embodiment illustrated in FIG. 6C, the plurality of conductive tiles 721 may have various shapes and layouts as illustrated in FIGS. 6A through 6D.

Further, an insulating member 730 may be inserted between the plurality of conductive tiles 721 and in outer spaces of the plurality of conductive tiles 721.

Further, the conductive plate may include a cutout part 740 as illustrated in FIG. 6B. The cutout part may be formed in a region corresponding to the winding center of the wireless transfer coil.

The cutout part 740 may be covered by an insulating layer, or may be filled with the insulating member 730.

Further, as described above with reference to FIG. 3, the insulating member may be coated to cover one surface of the conductive layer 720, and may serve as a protective layer 710 protecting the conductive layer 720.

Referring to FIG. 8, the portable terminal includes the device body 40, a coil substrate 20', and the cover 700. A coil wiring 21' formed on the coil substrate 20' may be electrically connected to the device body 40. Although one or more embodiments illustrate a case in which the coil wiring 21' is formed in a circular spiral shape, by way of example, various shapes may be possible.

The cover 700 couples to the device body 40 as a rear cover or a battery cover covering one surface of the coil wiring 21'. Accordingly, there the cover of the portable terminal may be capable of significantly reducing the current loss by preventing the formation of the eddy currents in some regions corresponding to the wireless transfer coil using the plurality of conductive tiles, and decreasing a temperature of a hot spot by diffusing thermal energy of the wireless transfer coil.

FIGS. 9A through 9D are views illustrating an example of a method for manufacturing a conductive plate.

Hereinafter, an example of a method for manufacturing a conductive plate will be described with reference to FIGS. 9A through 9D. However, an order of manufacturing operations may be changed.

Figure 9A:
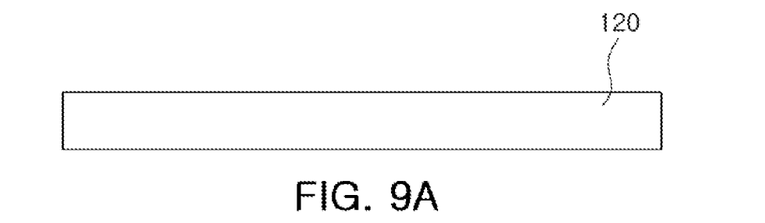
FIGS. 9A through 9D are views illustrating an example of a method for manufacturing a conductive plate.
Figure 9B:
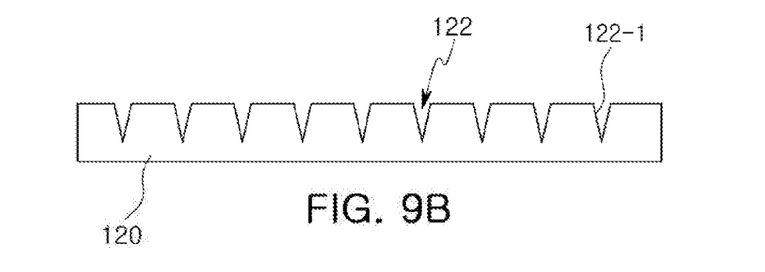
Figure 9C:
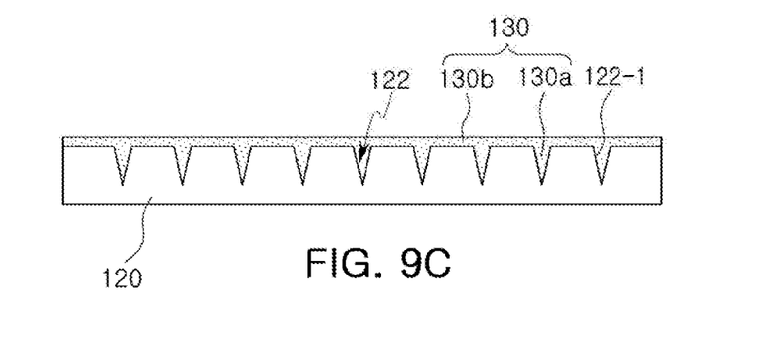

First, as illustrated in FIG. 9A, a metal plate is provided as a conductive layer 120, and as illustrated in FIG. 9B, a plurality of conductive tiles 121-1 to 121-N having a space therebetween are formed by a cutting or etching operation. As illustrated in FIG. 9C, an insulating member 130 is formed on the conductive layer 120. A first member 130a of the insulating member 130 is formed in the space between the plurality of conductive tiles 121-1 to 121-N. Further, a second member 130b of the insulating member 130 is coated onto the conductive layer 120 to cover a top surface of the conductive layer 120.

Figure 9D:
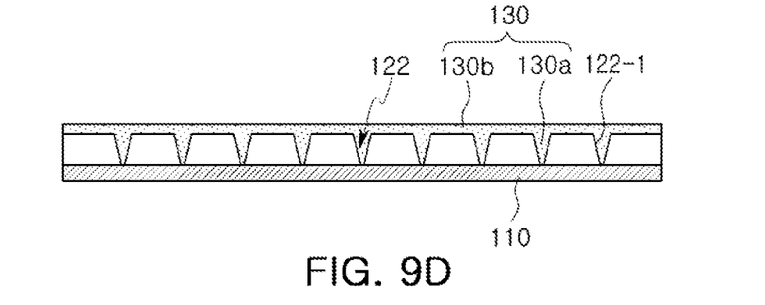

As illustrated in FIG. 9D, an insulating layer 110 may be formed by anodizing a bottom surface of the conductive layer 120.

As set forth above, according to the embodiments, the cover and the portable terminal including the same may significantly reduce the current loss by preventing the formation of eddy currents, whereby the wireless transfer efficiency may be maintained and the radiation and dissipation of heat may be effectively performed.

As a non-exhaustive example only, a portable terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cover of an electronic device, the cover comprising:
a conductive layer comprising a plurality of conductive tiles spaced apart from each other such that electromagnetic waves pass through spaces between the plurality of conductive tiles, and disposed in a region corresponding to a coil; and
a protective layer disposed on a surface of the conductive layer.

2. The cover of claim 1, wherein the protective layer comprises an insulating layer formed by anodizing the surface of the conductive layer.

3. The cover of claim 1, wherein the conductive layer comprises graphite.

4. The cover of claim 1, further comprising:
an insulating member disposed in the spaces.

5. The cover of claim 4, wherein the protective layer comprises an insulating member covering another surface of the conductive layer.

6. The cover of claim 1, wherein a shape of the conductive layer corresponds to a shape of the coil.

7. The cover of claim 6, wherein a region of the conductive layer other than the region corresponding to the coil has a substantially rectangular shape.

8. The cover of claim 1, further comprising a cutout part formed in a region corresponding to a winding center of the coil.

9. An electronic device comprising:
a device body;
a coil wiring connected to the device body; and
a cover disposed over a surface of the coil wiring,
wherein the cover comprises
a conductive layer comprising a plurality of conductive tiles spaced apart from each other such that electromagnetic waves pass through spaces between the plurality of conductive tiles, and disposed in a region corresponding to the coil wiring, and
a protective layer disposed on a surface of the conductive layer.

10. The electronic device of claim 9, wherein the protective layer comprises an insulating layer formed by anodizing another surface of the conductive layer.

11. The electronic device of claim 9, wherein the conductive layer comprises graphite.

12. The electronic device of claim 9, wherein the cover further comprises an insulating member disposed in the spaces.

13. The electronic device of claim 12, wherein the protective layer comprises another insulating member covering the surface of the conductive layer.

14. The electronic device of claim 9, wherein the protective layer comprises an insulating member disposed in the spaces and covers the surface of the conductive layer.

15. The electronic device of claim 9, wherein a shape of the conductive layer corresponds to a shape of the coil wiring.

16. The electronic device of claim 15, wherein the tiles have an arc shape and are arranged concentrically around a central axis of the coil wiring.

17. The electronic device of claim 9, further comprising a portable terminal and a display, and wherein the cover further comprises a cutout part formed in a region corresponding to a winding center of the coil wiring.

18. The electronic device of claim 9, wherein a region of the conductive layer other than the region corresponding to the coil wiring has a substantially rectangular shape.

19. An electronic device comprising:
a coil wiring; and
a cover disposed over the coil wiring,
wherein the cover comprises a conductive layer comprising
an insulating layer disposed on a first surface of the conductive layer,
protrusions extending from the insulating layer,
grooves disposed between the protrusions and extending from first surface of the conductive layer to a second surface of the conductive layer, opposite the first surface, and
an insulating material disposed in the grooves,
wherein the conductive layer is configured to prevent a current from flowing between the protrusions.

20. The electronic device of claim 19, wherein the protrusions are arranged concentrically around a central axis of the coil wiring.

* * * * *